Figure 1:
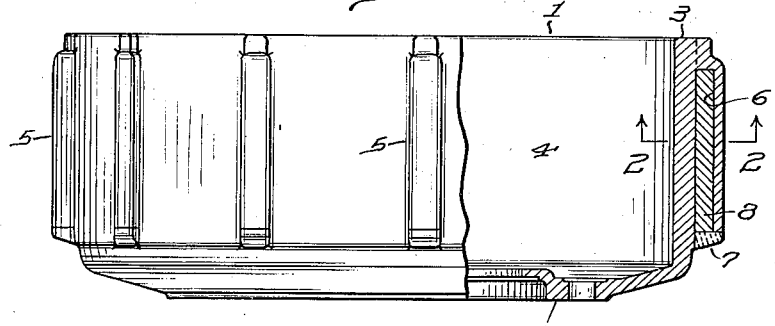

Dec. 9, 1941.    L. B. BOND    2,265,340

BRAKE DRUM

Filed Nov. 20, 1940

INVENTOR
Louis B. Bond.
BY
ATTORNEY

WITNESS
F. J. Hartman.

Patented Dec. 9, 1941

2,265,340

UNITED STATES PATENT OFFICE 2,265,340

BRAKE DRUM

Louis B. Bond, Christiana, Pa., assignor to Charles Bond Company, Philadelphia, Pa., a corporation of Pennsylvania Application November 20, 1940, Serial No. 366,369

8 Claims. (Cl. 188—218)

This invention relates to vehicle brake drums, especially to brake drums for automotive vehicles such as buses, trucks and the like in which expanding brake shoes frictionally engage the internal surface of a cylindrical flange portion of the drum to brake the vehicle, and is particularly directed to a novel brake drum in which the vibration set up by the friction of the brake shoes is effectively damped with consequent suppression of the offensive noise generally known as brake "squeal" which heretofore has been considered practically unavoidable.

Extensive research and experiment in the field of automotive brake drum acoustic phenomena have established that brake "squeal" is due, in large part at least, to resonance in the brake drums, which, as heretofore designed, act substantially in the same way as bells under the blows of their clappers in amplifying the vibration caused by the friction of the brake blocks bearing against the brake drums, and while efforts have heretofore been made to minimize this resonance in various ways, so far as I am aware none has been entirely successful or practical.

It is therefore a principal object of the invention to provide a substantially non-resonant brake drum adapted for large scale production at a reasonable cost and in which the vibrations set up during braking are damped and suppressed within the drum instead of being amplified and intensified by resonance of the drum itself with consequent prevention of brake "squeal" when the drum is in use.

Another object is the production of such a brake drum with spaced axially extending hollow ribs on its periphery having longitudinal cavities filled or substantially filled with sound deadening or resonance damping material whereby periodic or harmonic vibration of the drum as a whole, at least within the audible range, is inhibited.

It is well known that temperature, humidity and perhaps other atmospheric conditions affect brake "squeal" to some extent, and that it is more prevalent during hot, dry weather than at other times, and it is thus a further object of the invention to provide a brake drum in which audible vibration of the drum as a whole is effectively eliminated under any atmospheric conditions, brake drums embodying the invention being unaffected to any appreciable degree thereby and thus at all times substantially incapable of partaking of such vibration to produce brake "squeal."

Other objects, purposes and advantages of the invention will hereinafter more fully appear or will be understood from the following description of certain embodiments of it illustrated in the accompanying drawing.

Figure 2:
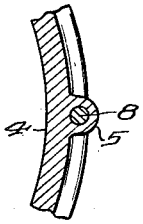

In the said drawing Fig. 1 is a view partly in elevation and partly in radial section of one of the said embodiments of the invention; and Fig. 2 is a fragmentary section on the line 2—2 in Fig. 1.

Figure 3:
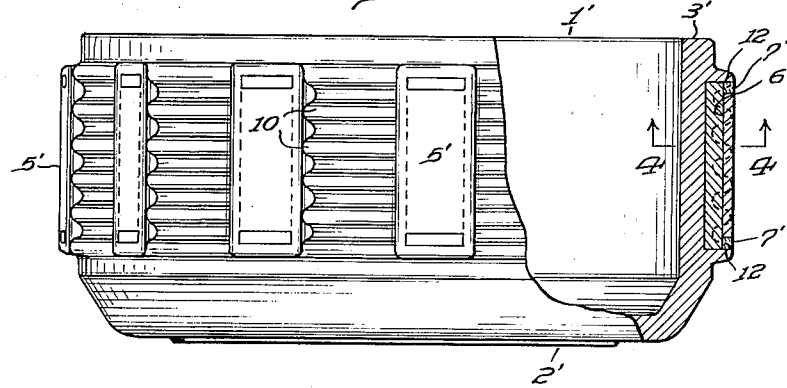
Figure 4:
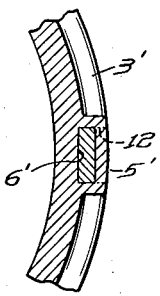
Figure 5:
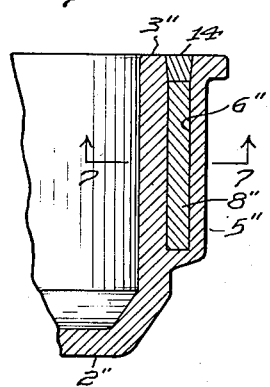
Figure 6:
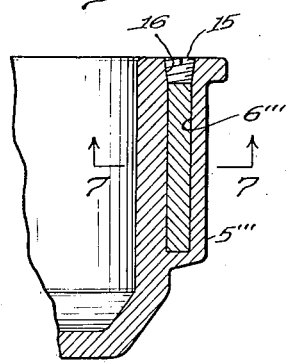
Figure 7:
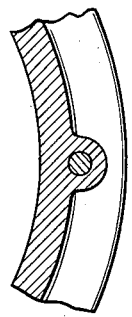

Figs. 3 and 4 are views corresponding to Figs. 1 and 2 illustrating another embodiment of the invention;

Figs. 5 and 6 are fragmentary radial sectional views showing still other ways of practicing the invention and Fig. 7 is a fragmentary section on lines 7—7 in Fig. 5 and 6.

In the several figures like characters are used to designate the same parts.

Referring now more particularly to the drawing, it will be understood the several brake drums therein illustrated are but typical embodiments of the invention which, however, is not limited in its practice to the production or use of brake drums of any of those specific types, as it may be incorporated as well in brake drums of other kinds, and its purposes and objects realized by the utilization of its principles in different ways not herein particularly disclosed.

The brake drum 1 shown in Figs. 1 and 2 thus comprises the customary annular web 2, which, in practice, is attached to the vehicle wheel by bolts or the like (not shown) and is surrounded by an integral generally cylindrical flange 3 the internal periphery of which presents a smooth braking surface 4 for contact by the brake shoes. At circumferentially spaced intervals of approximately 20°-30° about the external periphery of the flange I provide elongated substantially tubular ribs 5 integral with the flange and preferably formed while the drum is being cast or otherwise produced. One end of the cavity 6 in each rib is initially left open and these cavities in the several ribs are next filled with non-resonant sound absorbing or deadening material and their open ends then closed preferably by depositing weld metal 7 over the openings to seal the fillers 8 within the ribs. The fillers 8 may be made of any suitable sound-deadening material such as lead or any generally similar low-melting point relatively soft alloy which can be readily melted and poured while hot into the rib cavities. Or the fillers may be pre-formed of like material, or even of wood, and driven into the cavities, or if preferred, they may be filled with a suitable comminuted solid such as sand, salt or the like.

In the drum 1' illustrated in Figs. 3 and 4 the annular web 2' is generally conical adjacent its perimeter and the flange 3' has circumferential ribs 10 which are considered desirable by some manufacturers to impart additional strength and/or heat radiating capacity to the drum. In accordance with my invention these ribs 10, when employed, are interrupted at spaced intervals by the interposition of integral hollow ribs 5' paralleling the drum axis and having internal preferably substantially rectangular cavities 6' to which access initially may be had through either of two openings 12 adjacent the cavity ends.

In this drum the rib cavities 6' may be filled through either opening 12 before the openings are sealed with weld metal 7' or the like, but because of the shape of the cavities and the openings, it is generally more convenient to fill the cavities with a substance which can be poured or rammed through the openings. Thus molten lead or solder, or sand, salt or other comminuted material desirably may be used, since sticks or rods of lead or wood could be inserted only with difficulty, if at all.

In Figs. 5, 6 and 7 I have illustrated certain other specific forms of ribs 5'', 5''' the nature of which will be apparent upon examination of the drawing without detailed description. In the form shown in Fig. 5 the rib cavity 6'', opening toward the free edge of the drum flange 3'' instead of toward the web portion 2'', is closed and sealed, after insertion of the sound-deadening filler 8'', by a tapered plug 14 which may be driven into the end of the cavity and held in place by friction, or it may be welded in place to make it more secure if desired, while the closure for the cavity 6''' in the drum 1''' shown in Fig. 6 may be a threaded plug 15 cooperative with internal threads 16 at the end of the cavity to retain the filler in place therein.

It will be apparent from the foregoing that in accordance with my invention a brake drum is provided having ribs extending parallel to its axis with cores or fillers of material having sound-deadening properties in the ribs whereby resonance in the drum is effectively minimized and its tendency to "squeal" upon application of the brake shoes thereby substantially eliminated; the strength of the drum moreover may be somewhat enhanced by its construction and its cooling assisted by the turbulence in the adjacent air set up by the ribs.

Thus my invention constitutes a distinct advance in the art and may be embodied in drums of different specific types and in conjunction with various changes and modifications other than those to which reference has herein specifically been made, without departing from its spirit and scope as defined in the appended claims.

Having thus described my invention, I claim and desire to protect by Letters Patent of the United States:

1. A brake drum comprising web and flange portions, a plurality of circumferentially spaced ribs integral with the flange portion and having cavities substantially paralleling its axis, non-resonant material disposed within the cavities, and means for holding said material therein.

2. A brake drum having a substantially cylindrical flange portion, a plurality of ribs integral therewith, projecting from its external periphery and having cavities substantially paralleling its axis, non-resonant material disposed in the cavities, and means for holding said material therein.

3. A brake drum having peripheral ribs paralleling its axis, relatively soft metal disposed in a cavity extending longitudinally in each rib in intimate contact with its inner walls, and relatively hard metal disposed at each end of the rib for maintaining said soft metal therein.

4. A brake drum comprising a substantially circular web portion and a substantially cylindrical flange portion integral therewith and having an internal surface adapted for engagement by friction braking means, a plurality of circumferentially spaced peripheral ribs integral with the flange portion and containing elongated cavities paralleling its axis, a non-resonant filler in each cavity, and means obstructing the ends of the cavities to retain said fillers therein.

5. A brake drum comprising a substantially circular web portion and a substantially cylindrical flange portion integral therewith and having an internal surface adapted for engagement by friction braking means, a plurality of circumferentially spaced peripheral ribs integral with the flange portion and containing elongated cavities paralleling its axis, a relatively soft filler in each rib cavity adapted to damp vibration of the brake drum, and means for holding the fillers in the cavities.

6. A brake drum comprising a substantially circular web portion and a substantially cylindrical flange portion integral therewith and having an internal surface adapted for engagement by friction braking means, a plurality of circumferentially spaced peripheral ribs integral with the flange portion and containing elongated cavities paralleling its axis, a filler of low melting point metal occupying the cavity in each rib, and weld metal applied to an end of each cavity to maintain the filler therein.

7. A cast metal brake drum for internally applied brakes having a plurality of integral ribs paralleling the drum axis on the outer periphery of the drum, each having a non-resonant-metal-filled cavity extending longitudinally of the rib.

8. A cast metal brake drum for internally applied brakes having a plurality of ribs paralleling the drum axis on the outer periphery of the drum having non-resonant-metal-filled cavities and circumferentially extending solid ribs interposed between adjacent metal filled ribs.

LOUIS B. BOND.